US012562051B2

(12) United States Patent
Nagashima et al.

(10) Patent No.: US 12,562,051 B2
(45) Date of Patent: Feb. 24, 2026

(54) DRIVING ASSISTANCE SYSTEM, DRIVING ASSISTANCE DEVICE, AND DRIVING ASSISTANCE METHOD

(71) Applicant: NEC Corporation, Tokyo (JP)

(72) Inventors: Seito Nagashima, Tokyo (JP); Sawaka Seki, Tokyo (JP); Takashi Nunomoto, Tokyo (JP); Takumi Shiba, Tokyo (JP); Hitomi Ito, Tokyo (JP); Kosei Kobayashi, Tokyo (JP); Masaru Yanai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 21 days.

(21) Appl. No.: 18/700,737

(22) PCT Filed: Nov. 4, 2021

(86) PCT No.: PCT/JP2021/040486
§ 371 (c)(1),
(2) Date: Apr. 12, 2024

(87) PCT Pub. No.: WO2023/079604
PCT Pub. Date: May 11, 2023

(65) Prior Publication Data
US 2025/0006044 A1 Jan. 2, 2025

(51) Int. Cl.
*G08G 1/01* (2006.01)
*G08G 1/00* (2006.01)
(Continued)

(52) U.S. Cl.
CPC ........... *G08G 1/0116* (2013.01); *G08G 1/091* (2013.01); *G08G 1/0965* (2013.01); *G08G 1/20* (2013.01)

(58) Field of Classification Search
CPC .... G08G 1/0116; G08G 1/091; G08G 1/0965; G08G 1/20
See application file for complete search history.

(56) References Cited

U.S. PATENT DOCUMENTS

| | | | | |
|---|---|---|---|---|
| 10,909,848 B2 * | 2/2021 | Suzuki | ............. | G08G 1/096783 |
| 2010/0030397 A1 * | 2/2010 | Tachibana | ................ | B62K 1/00 701/1 |

(Continued)

FOREIGN PATENT DOCUMENTS

| | | |
|---|---|---|
| JP | 2009-211265 A | 9/2009 |
| JP | 2016-218726 A | 12/2016 |

(Continued)

OTHER PUBLICATIONS

International Search Report for PCT Application No. PCT/JP2021/040486, mailed on Jan. 25, 2022.

*Primary Examiner* — Mohamed Barakat
(74) *Attorney, Agent, or Firm* — Sughrue Mion, PLLC

(57) ABSTRACT

This driving assistance system is provided with: a position specification unit that specifies the positions of vehicles passing along a road; a selection unit that selects a first vehicle from the vehicles; an area-setting that sets, around the first vehicle, an attention call area of a prescribed shape that moves following the movement of the first vehicle; a notification unit that notifies a second vehicle that has entered the attention call area of the presence of the first vehicle; and, an area change unit that expands the attention call area according to the state of the first vehicle.

18 Claims, 14 Drawing Sheets

(51) Int. Cl.

| | |
|---|---|
| ***G08G 1/09*** | (2006.01) |
| ***G08G 1/0965*** | (2006.01) |

(56) References Cited

U.S. PATENT DOCUMENTS

| | | | | |
|---|---|---|---|---|
| 2015/0353088 | A1* | 12/2015 | Ishikawa | B60W 50/082<br>701/23 |
| 2018/0090004 | A1* | 3/2018 | Kuraoka | G08G 1/017 |
| 2018/0120415 | A1* | 5/2018 | Mcquillen | G05D 1/0257 |
| 2018/0174464 | A1* | 6/2018 | Ikedo | G08G 1/166 |
| 2019/0221117 | A1* | 7/2019 | Kume | G08G 1/167 |
| 2022/0208008 | A1* | 6/2022 | Matsuoka | B60W 50/14 |

FOREIGN PATENT DOCUMENTS

| | | | | |
|---|---|---|---|---|
| JP | 2019070880 | A | * | 5/2019 |
| JP | 2020-030718 | A | | 2/2020 |

* cited by examiner

DRIVING ASSISTANCE SYSTEM, DRIVING ASSISTANCE DEVICE, AND DRIVING ASSISTANCE METHOD

This application is a National Stage Entry of PCT/JP2021/040486 filed on Nov. 4, 2021, the contents of all of which are incorporated herein by reference, in their entirety.

TECHNICAL FIELD

The present invention relates to a driving assistance system, a driving assistance device, and a driving assistance method.

BACKGROUND ART

PTL 1 discloses an inter-vehicle distance control device capable of preventing a traffic accident in advance. Specifically, the inter-vehicle distance control device acquires host vehicle position information indicating the position of the host vehicle by satellite communication. Furthermore, when there is another vehicle around the host vehicle, the inter-vehicle distance control device performs wireless communication as an inter-vehicle distance control device mounted on the other vehicle, and acquires all other-vehicle position information indicating the position of the other vehicle. Then, the inter-vehicle distance control device specifies other vehicles before and after the host vehicle, and when the inter-vehicle distance is shorter than the search appropriate inter-vehicle distance, the inter-vehicle distance control device notifies a driver of the host vehicle of attention information indicating that the inter-vehicle distance is shorter than the search appropriate inter-vehicle distance.

CITATION LIST

Patent Literature

PTL 1: JP 2009-211265 A

SUMMARY OF INVENTION

Technical Problem

The following analysis was given by the inventor. In the method of PTL 1, since it is determined whether the inter-vehicle distance is appropriate based on a vehicle speed of the host vehicle, it is not possible to appropriately call attention to the following vehicle. For example, when the driver of the vehicle is notified that the inter-vehicle distance from the preceding vehicle is short and brakes, the following vehicle may be delayed in noticing this.

An object of the present invention is to provide a driving assistance system, a driving assistance device, and a driving assistance method capable of appropriately attracting attention in various situations.

Solution to Problem

According to a first viewpoint, there is provided a driving assistance system including a position specifying means that specifies a position of a vehicle traveling on a road, a selection means that selects a first vehicle from the vehicles, an area setting means that sets, around the first vehicle, a call attention area having a predetermined shape that moves following movement of the first vehicle, a notification means that notifies a second vehicle that has entered the call attention area of presence of the first vehicle, and an area changing means that enlarges or reduces the call attention area according to a state of the first vehicle.

According to a second viewpoint, there is provided a driving assistance device including a position specifying means that specifies a position of a vehicle traveling on a road, a selection means that selects a first vehicle from the vehicles, an area setting means that sets, around the first vehicle, a call attention area having a predetermined shape that moves following movement of the first vehicle, a notification means that notifies a second vehicle that has entered the call attention area of presence of the first vehicle, and an area changing means that enlarges or reduces the call attention area according to a state of the first vehicle.

According to a third viewpoint, there is provided a driving assistance method including specifying a position of a vehicle traveling on a road, selecting a first vehicle from the vehicles, setting, around the first vehicle, a call attention area having a predetermined shape that moves following movement of the first vehicle, enlarging or reducing the call attention area according to a state of the first vehicle, and notifying a second vehicle that has entered the enlarged or reduced call attention area of presence of the first vehicle. The present method is linked to a specific machine called a driving assistance device capable of specifying a position of a vehicle traveling on a road.

According to a fourth aspect, there is provided a computer program for causing a computer to execute a process of specifying a position of a vehicle traveling on a road, a process of selecting a first vehicle from the vehicles, a process of setting, around the first vehicle, a call attention area having a predetermined shape that moves following movement of the first vehicle, a process of enlarging or reducing the call attention area according to a state of the first vehicle, and a process of notifying a second vehicle that has entered the enlarged or reduced call attention area of presence of the first vehicle. The computer program can be recorded in a computer-readable (non-transitory) storage medium. That is, the present invention can also be embodied as a computer program product.

Advantageous Effects of Invention

According to the present invention, it is possible to appropriately call attention to the following vehicle and the like even in various situations.

EXAMPLE EMBODIMENT

First Example Embodiment

Figure 1:
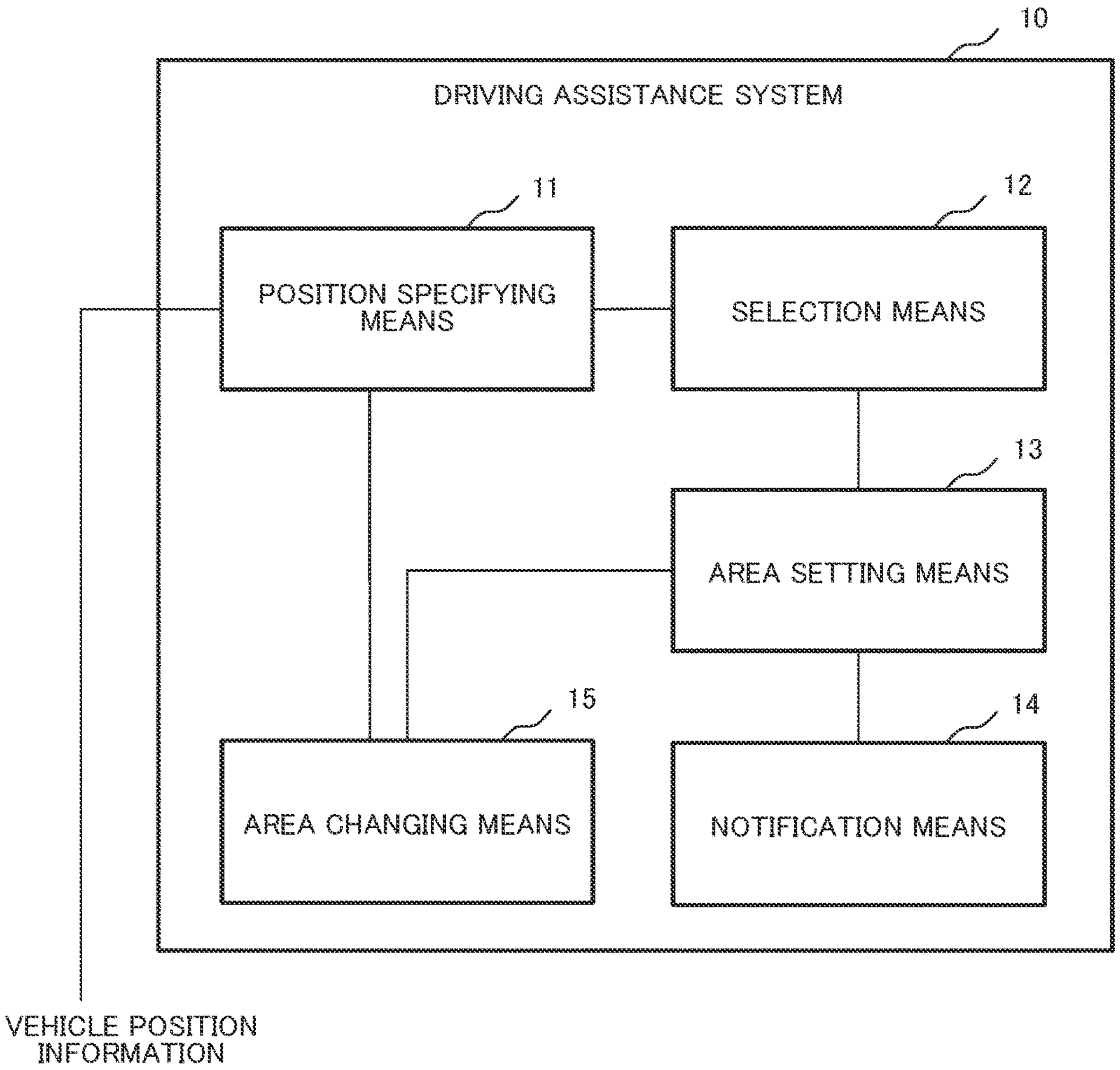
FIG. 1 is a diagram illustrating a configuration of a driving assistance system according to a first example embodiment of the present invention.

Next, a first example embodiment of the present invention will be described in detail with reference to the drawings. Reference numerals in the drawings used in the following description are given to elements for convenience as an example for assisting understanding, and are not intended to limit the present invention to the illustrated aspects. Connection lines between blocks in the drawings and the like referred to in the following description include both bidirectional and unidirectional. The unidirectional arrow schematically indicates a flow of a main signal (data), and does not exclude bidirectionality. Although there are ports and interfaces at connection points of input and output of each block in the drawing, they are not illustrated.

FIG. 1 is a diagram illustrating a configuration of a driving assistance system according to a first example embodiment of the present invention. Referring to FIG. 1, a driving assistance system 10 including a position specifying means 11, a selection means 12, an area setting means 13, a notification means 14, and an area changing means 15 is illustrated.

The position specifying means 11 specifies a position of a vehicle traveling on a road. Various methods can be considered as a method of specifying the position of the vehicle traveling on the road by the position specifying means 11. In some cases, an in-vehicle terminal mounted on a vehicle traveling on a road has a narrow-band communication function called dedicated short range communications (DSRC) or a wireless communication function using a PC5 interface, a Uu interface, or the like, and has a function of reporting a position of the in-vehicle terminal. In this case, the position specifying means 11 can specify the position of the vehicle traveling on the road by directly or indirectly obtaining the position information of each vehicle from these in-vehicle terminals. The vehicle whose position is to be specified by the position specifying means 11 may be limited to a vehicle present in a predetermined section of a preset road. For example, the predetermined section may be limited to a section in which position information can be acquired from a roadside device or a base station, or a section in which a position can be specified by a camera.

Figure 2:
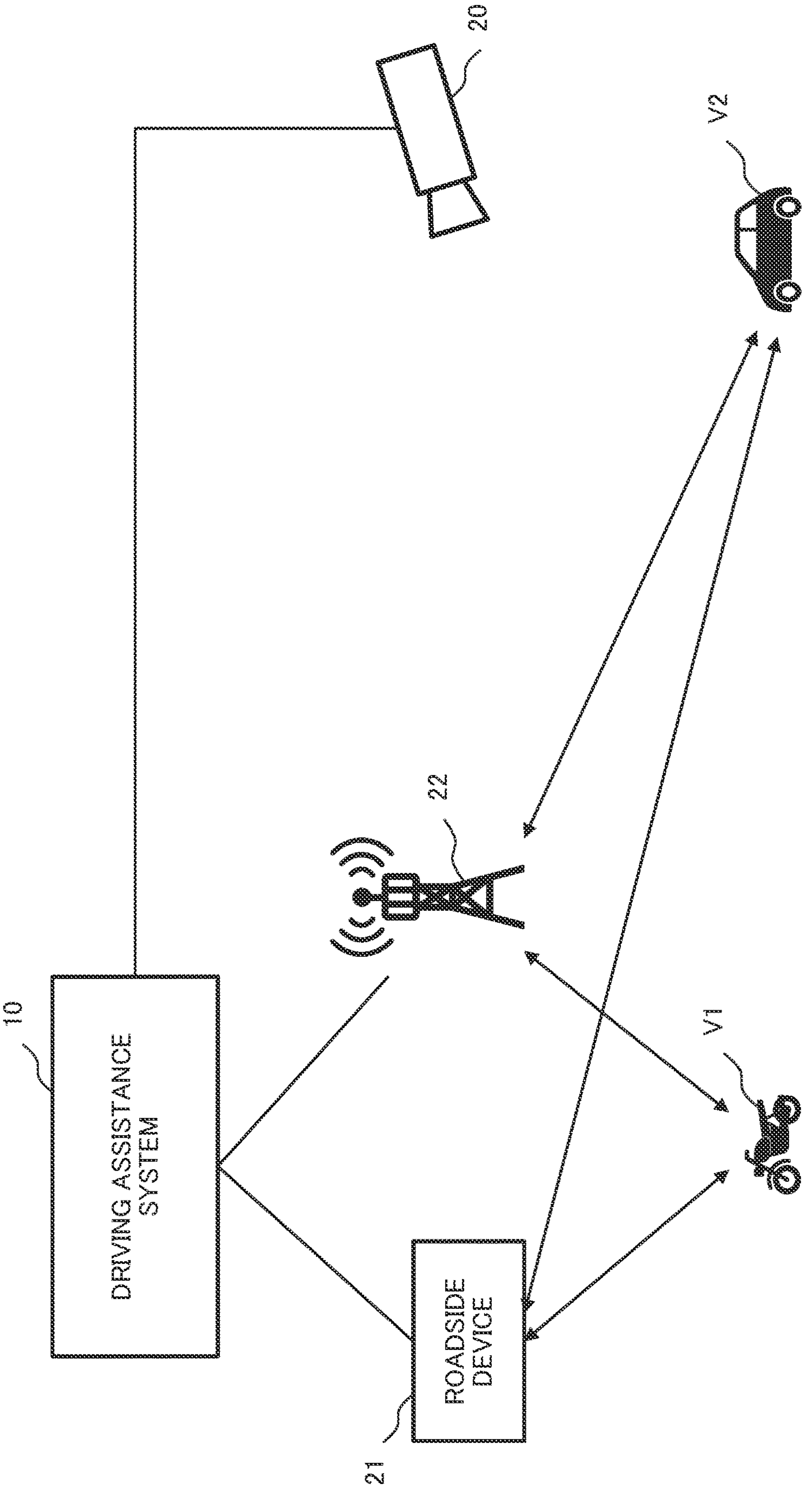
FIG. 2 is a diagram for describing a mechanism in which the driving assistance system according to the first example embodiment of the present invention specifies a position of a vehicle.

FIG. 2 is a diagram for describing a mechanism in which the position specifying means 11 of the driving assistance system 10 of the present example embodiment specifies positions of vehicles V1 and V2. For example, the in-vehicle terminals mounted on the vehicles V1 and V2 transmit the position information to the driving assistance system 10 via the roadside device 21 or a base station (mobile communication network) 22 using the wireless communication function. The information provided by the in-vehicle terminal to the driving assistance system side may include not only the position but also a speed, acceleration, heading, and the like of the host vehicle. As the position information transmitted as the position of the own device by the in-vehicle terminal, position information measured by a global positioning system (GPS) device mounted on the vehicle or position information managed by a car navigation system can be used.

The position specifying means 11 specifies the position of the vehicle traveling on the road using the position information received from the in-vehicle terminals mounted on the vehicles V1 and V2. In a case where the acquisition interval of the position information from the vehicles V1 and V2 is long, the position specifying means 11 may estimate the positions of the vehicles V1 and V2 using the position information received from the in-vehicle terminal, the above-described speed, acceleration, heading, and the like.

The position specifying means 11 may specify the positions of the vehicles V1 and V2 traveling on the road from an image captured by a camera 20 or the like installed around the road and capable of capturing the road. The specification of the position of the vehicle from the image can be achieved by determining the position on the plane coordinates from the display position of the vehicle on the image. Of course, the positions of the vehicles V1 and V2 may be specified using both the positions of the vehicles V1 and V2 specified from the image and the position information received from the in-vehicle terminal of the vehicle.

The selection means 12 selects a first vehicle from among the vehicles specified by the position specifying means 11.

For example, the selection means 12 selects a vehicle conforming to a predetermined standard from among vehicles traveling on the road. The predetermined criterion may narrow down a target vehicle from vehicle information such as a vehicle type, position information, a speed, and a direction of the vehicle, and an instruction direction of a direction indicator. The predetermined criterion may be to narrow down the target vehicle based on whether a driver of the vehicle has subscribed to a watching service, and based on personal information such as an attribute (age, sex) of the driver. These pieces of information may be acquired together with the position information from each vehicle, or may be specified from an image or the like captured by the camera 20.

The area setting means 13 sets, around the first vehicle, a call attention area having a predetermined shape that moves following the movement of the first vehicle. The call attention area is a virtual area for the driving assistance system 10 to watch the safety of the first vehicle, and can take various shapes according to a form of an accident to be prevented. For example, the call attention area may have an elliptical shape surrounding the periphery of the first vehicle. By adopting such an elliptical shape, it is possible to give a warning not only to rear-end collision from the rear but also to other vehicles approaching from the side. Of course, the shape of the call attention area is not limited to an ellipse, and various shapes such as a rectangle and a polygon can be adopted.

The notification means 14 notifies the second vehicle that has entered the call attention area of the presence of the first vehicle. As a method of detecting the second vehicle in the notification means 14, a method of determining whether there is a vehicle that has entered the call attention area by acquiring the latest position information of the vehicle from the position specifying means 11 can be adopted. As a method of notifying the second vehicle of the presence of the first vehicle, for example, a method of broadcasting a notification or a call attention message notifying the in-vehicle terminal of the second vehicle of the presence of the first vehicle can be adopted. In a case where a notification or a call attention message notifying of the presence of the first vehicle is broadcast, it is conceivable that a vehicle other than the second vehicle receives these pieces of information. However, the information transmitted by the notification means 14 may include information for specifying the position of a receiver or information for specifying the second vehicle. In this way, it is possible to specify whether the vehicle that has received the notification or the call attention message notifying of the presence of the first vehicle is the second vehicle. In a case where a communication address of each vehicle can be grasped on the driving assistance system 10 side, a method of transmitting these pieces of information by unicast can also be adopted. The output form of the notification or the call attention message notifying the presence of the first vehicle in the second vehicle is not particularly limited. For example, it may be output as a character to a display device connected to the in-vehicle terminal, or may be output by voice. The notification means 14 may notify the first vehicle of the presence of the second vehicle when the second vehicle enters the call attention area.

The area changing means 15 enlarges or reduces the call attention area according to the state of the first vehicle. In the present example embodiment, the speed of the first vehicle is used as the state of the first vehicle, and will be described in detail later together with the description of the operation.

The driving assistance system 10 described above may be integrated into one device (driving assistance device), or each functional unit may be arranged in a distributed manner. Such a driving assistance device can be configured by a cloud base, a server installed on the Internet, or the like. The driving assistance device may also serve as an MEC server or a device functioning as a roadside device (reference numeral 21 in FIG. 2) installed at a position physically close to the base station. "MEC" is an abbreviation for Multi-access Edge Computing or Mobile Edge Computing.

Figure 3:
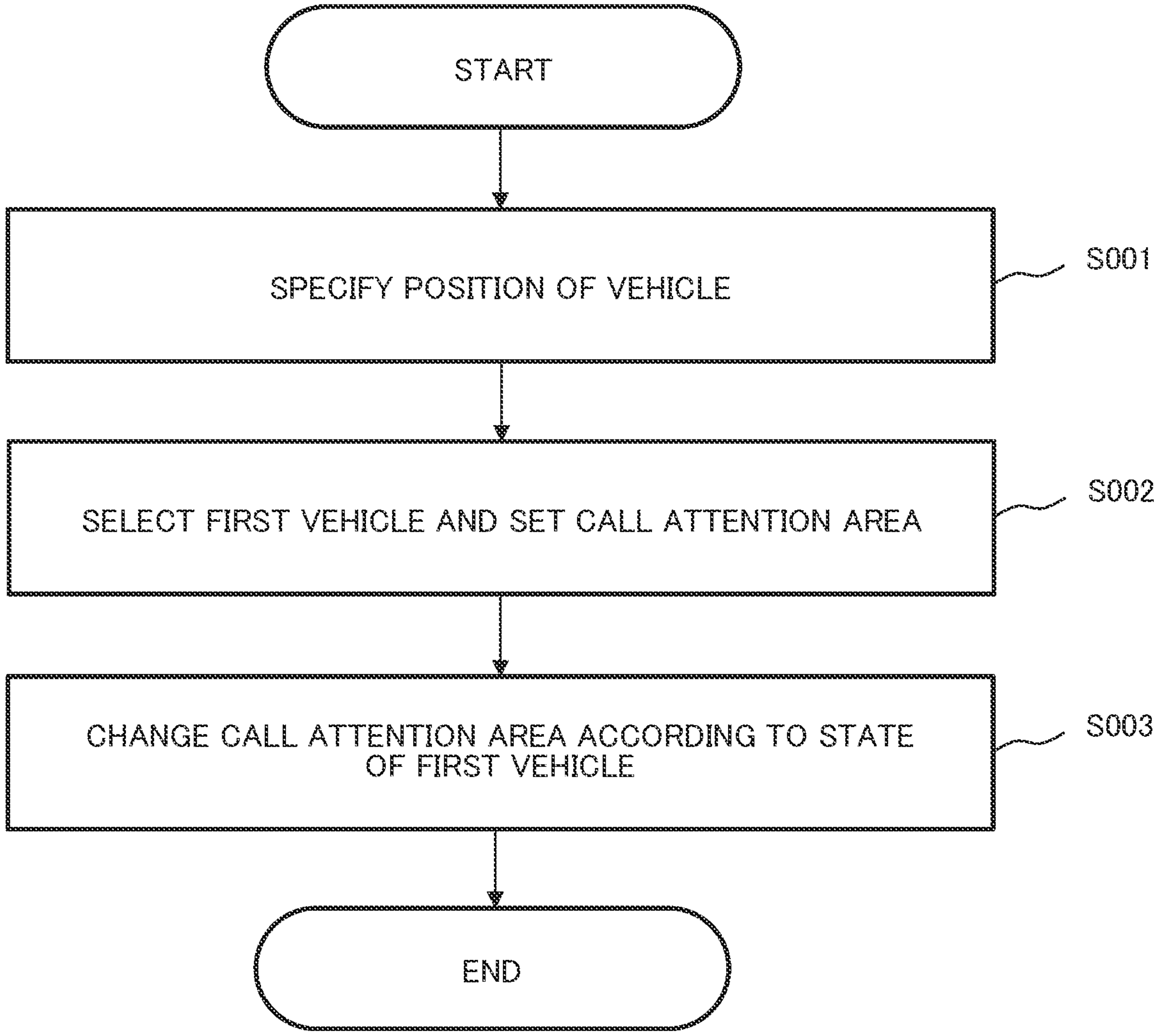
FIG. 3 is a flowchart illustrating an operation of the driving assistance system according to the first example embodiment of the present invention.
Figure 4A:
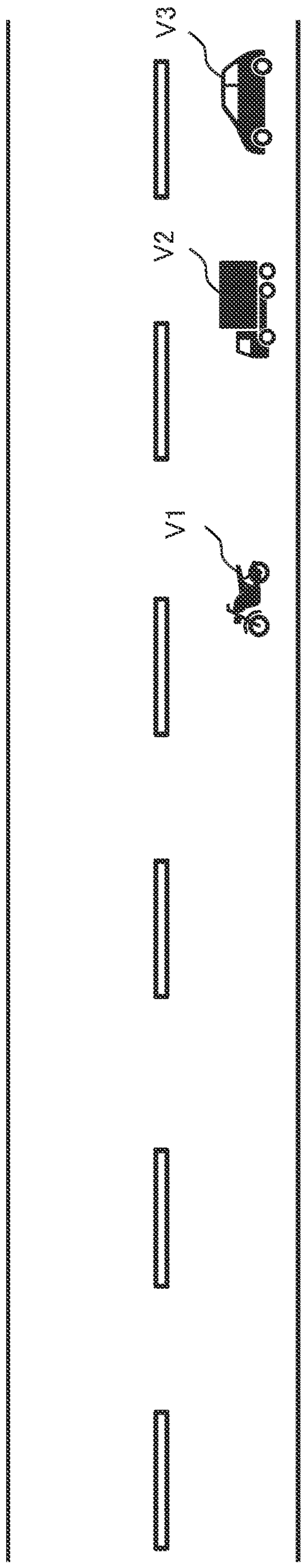
FIG. 4A is a diagram for describing the operation of the driving assistance system according to the first example embodiment of the present invention.

Next, the operation of the present example embodiment will be described in detail with reference to the drawings. FIG. 3 is a flowchart illustrating an operation of the driving assistance system 10 according to the first example embodiment of the present invention. Referring to FIG. 3, first, the driving assistance system 10 specifies a position of a vehicle traveling a road (Step S001). For example, as illustrated in FIG. 4A, the driving assistance system 10 specifies positions of vehicles V1, V2, V3 traveling on a left lane of the road.

Figure 4B:
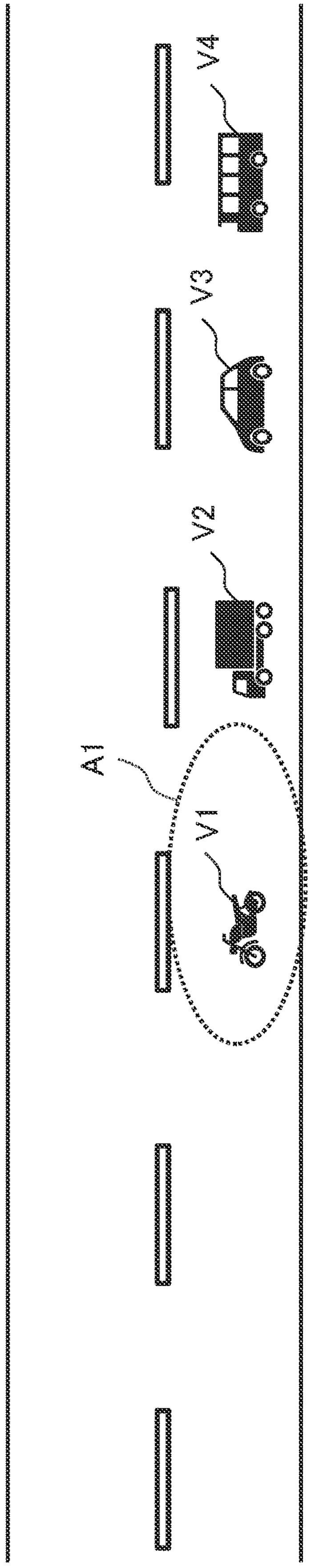
FIG. 4B is a diagram for describing the operation of the driving assistance system according to the first example embodiment of the present invention.

Next, the driving assistance system 10 selects a first vehicle from the vehicles V1 to V3, and sets a call attention area having a predetermined shape that moves following the movement of the first vehicle around the first vehicle (Step S002). For example, as illustrated in FIG. 4B, the driving assistance system 10 selects the vehicle V1 from among the vehicles V1 to V3, and sets a call attention area A1 around the vehicle V1. Various selection criteria can be considered for the first vehicle, and for example, a rule for preferentially selecting a motorcycle, a small automobile, or the like can be used. In this way, it is possible to preferentially watch a vehicle that is likely to be greatly damaged when being involved in an accident. Of course, in a case where there is a margin for the processing capability of the driving assistance system 10, all the vehicles may be selected as the first vehicles, and the call attention area A1 may be set for each vehicle.

Figure 5A:
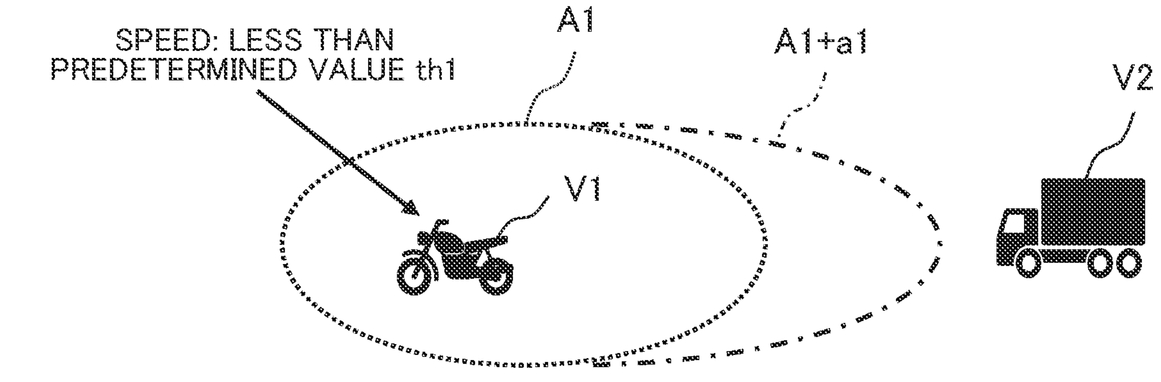
FIG. 5A is a diagram for describing an example of change processing of a call attention area by the driving assistance system according to the first example embodiment of the present invention.

Next, the driving assistance system 10 enlarges or reduces the call attention area according to the state of the vehicle V1 (Step S003). For example, when the speed of the vehicle V1 is less than a predetermined threshold th1, the driving assistance system 10 changes the call attention area A1 to a call attention area A1+a1 enlarged to the rear side of the vehicle V1 as illustrated in FIG. 5A. In this way, it is possible to call attention to the vehicle V2 approaching a low-speed vehicle at an earlier stage. The threshold th1 may be a fixed value in consideration of a speed limit or the like of the corresponding road, or may be a variable threshold that is changed based on an average vehicle speed or the like of the corresponding time zone of the corresponding road. The state of the vehicle V1 includes a state around the vehicle V1. For example, the size of the call attention area may be changed based on the state in the call attention area A1, specifically, the vehicle type of the vehicle V2 that has entered the call attention area A1, and the vehicle information such as the position information, the speed, the direction, and the instruction direction of the direction indicator. More specifically, the call attention area A1 may be enlarged when the speed of the vehicle V2 that has entered the call attention area A1 is larger than a predetermined value. Instead of the comparison between the speed of the vehicle V1 and the threshold th1, the call attention area A1 may be enlarged when the difference between the speed of the vehicle V2 and the speed of the vehicle V1 or the relative speed is larger than a predetermined value, that is, when the inter-vehicle distance is narrowed.

Figure 5B:
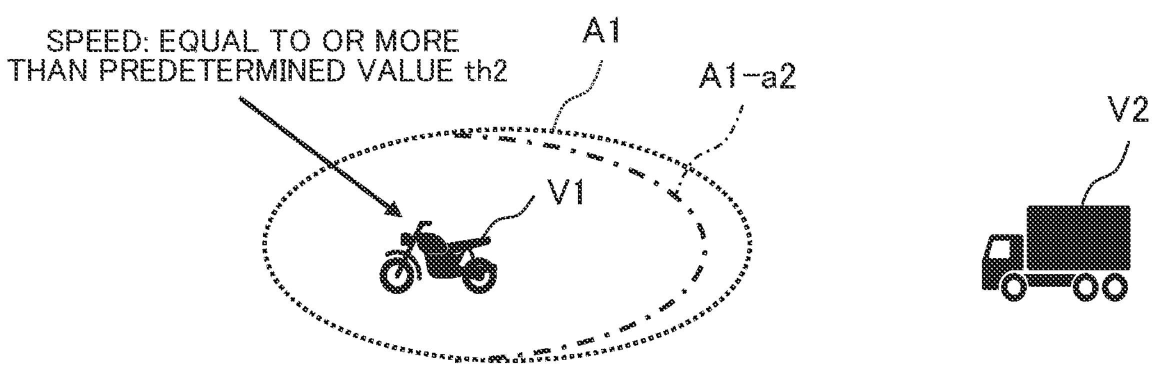
FIG. 5B is a diagram for describing an example of the change processing of a call attention area by the driving assistance system according to the first example embodiment of the present invention.

For example, when the speed of the vehicle V1 is equal to or more than a predetermined threshold th2 (where th2≥th1), the driving assistance system 10 changes the call attention area A1 to a call attention area A1−a2 reduced toward the vehicle V1 as illustrated in FIG. 5B. In this way, it is possible to prevent unnecessary attention from being attracted to the following vehicle V2. The threshold th2 may be a fixed value in consideration of the speed limit or the like of the corresponding road, or may be a variable threshold that is changed based on an average vehicle speed or the like of the corresponding time zone of the corresponding road. Instead of the comparison between the speed of the vehicle V1 and the threshold th2, the call attention area A1 may be reduced in a case where the difference between the speed of the vehicle V2 and the speed of the vehicle V1, that is, the relative speed takes a negative value, that is, in a case where the inter-vehicle distance is widened.

Figure 6:
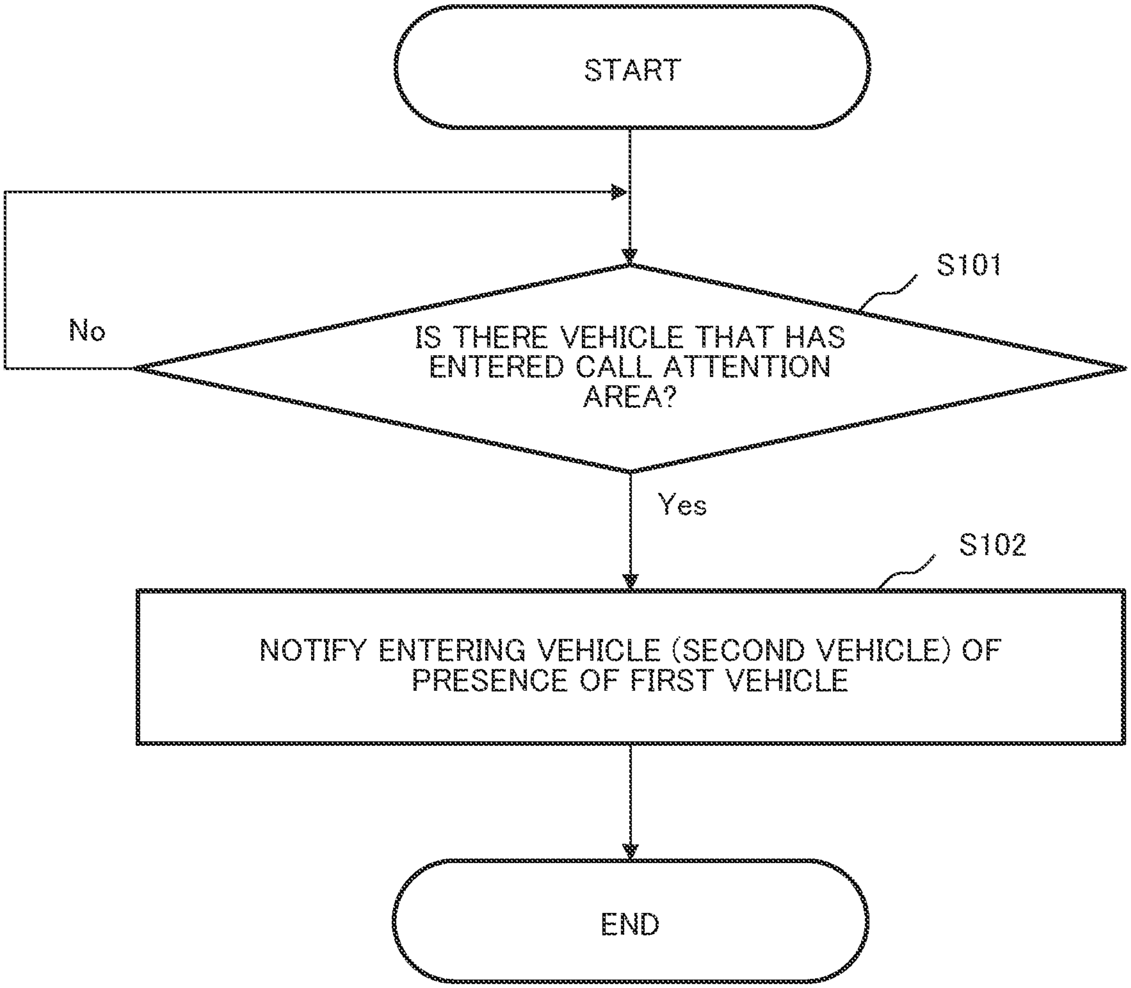
FIG. 6 is a flowchart illustrating another operation of the driving assistance system according to the first example embodiment of the present invention.

Subsequently, a warning operation to the following vehicle or the like (second vehicle) using the call attention area set as described above will be described. FIG. 6 is a flowchart illustrating an operation of the driving assistance system 10 of the present example embodiment. First, the driving assistance system 10 checks whether there is a vehicle that has entered the call attention area at predetermined time intervals (Step S101).

Figure 7:
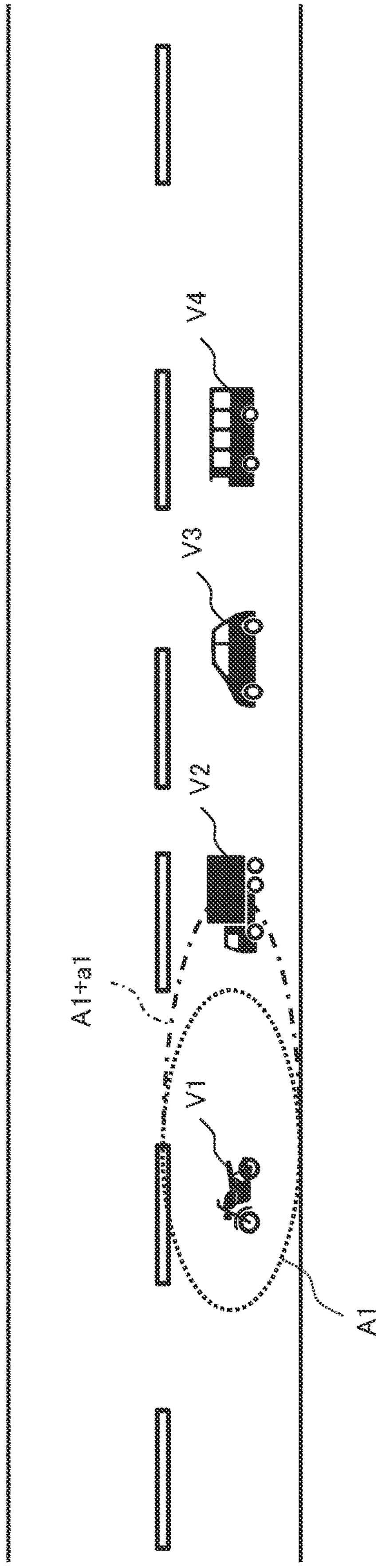
FIG. 7 is a diagram for describing the operation of the driving assistance system according to the first example embodiment of the present invention.

When a vehicle that has entered the call attention area is found as the result of the checking process, the driving assistance system 10 notifies the entering vehicle (second vehicle) of the presence of the first vehicle (Step S102). For example, as illustrated in FIG. 7, when the vehicle V2 enters enlarged call attention area A1+a1 set in the vehicle V1, the driving assistance system 10 notifies the second vehicle (vehicle V2) of the presence of the first vehicle V1. This notification may simply notify the presence of the vehicle V1, or may notify that the inter-vehicle distance from the vehicle V1 is short. This notification may include the speed of the first vehicle V1, the inter-vehicle distance from the first vehicle V1, and the like, or may include recommended operations such as "deceleration" and "lane change".

As a result of the checking process, when there is no vehicle that has entered the call attention area, the driving assistance system 10 returns the step to Step S101, and continues to check whether there is the vehicle that has entered the call attention area is continued (No in Step S102).

As described above, according to the driving assistance system of the present example embodiment, it is possible to appropriately call attention to the following vehicle or the like according to the state of the first vehicle. In the above-described example embodiment, it has been described that the speed of the vehicle V1 is used as the state information used when the call attention area is changed, but other information of the vehicle V1 can also be used. For example, when the driving assistance system 10 obtains the attribute information of the driver of the vehicle V1 and the information of the vehicle from the cloud, the camera 20, or the like, the driving assistance system 10 may use these pieces of information to enlarge or reduce the call attention area based on these pieces of information. For example, when the driver of the vehicle V1 has a short driving history or when the driver of the vehicle V1 is an elderly person, the call attention area may be enlarged. In this way, it is possible to suppress inadvertent approach to a vehicle driven by a driver with a short driving history or an elderly driver. For example, when there is an abnormality in the state of the vehicle of the vehicle V1, the call attention area may be enlarged. In this way, it is possible to suppress inadvertent approach to the vehicle V1.

Second Example Embodiment

Figure 8:
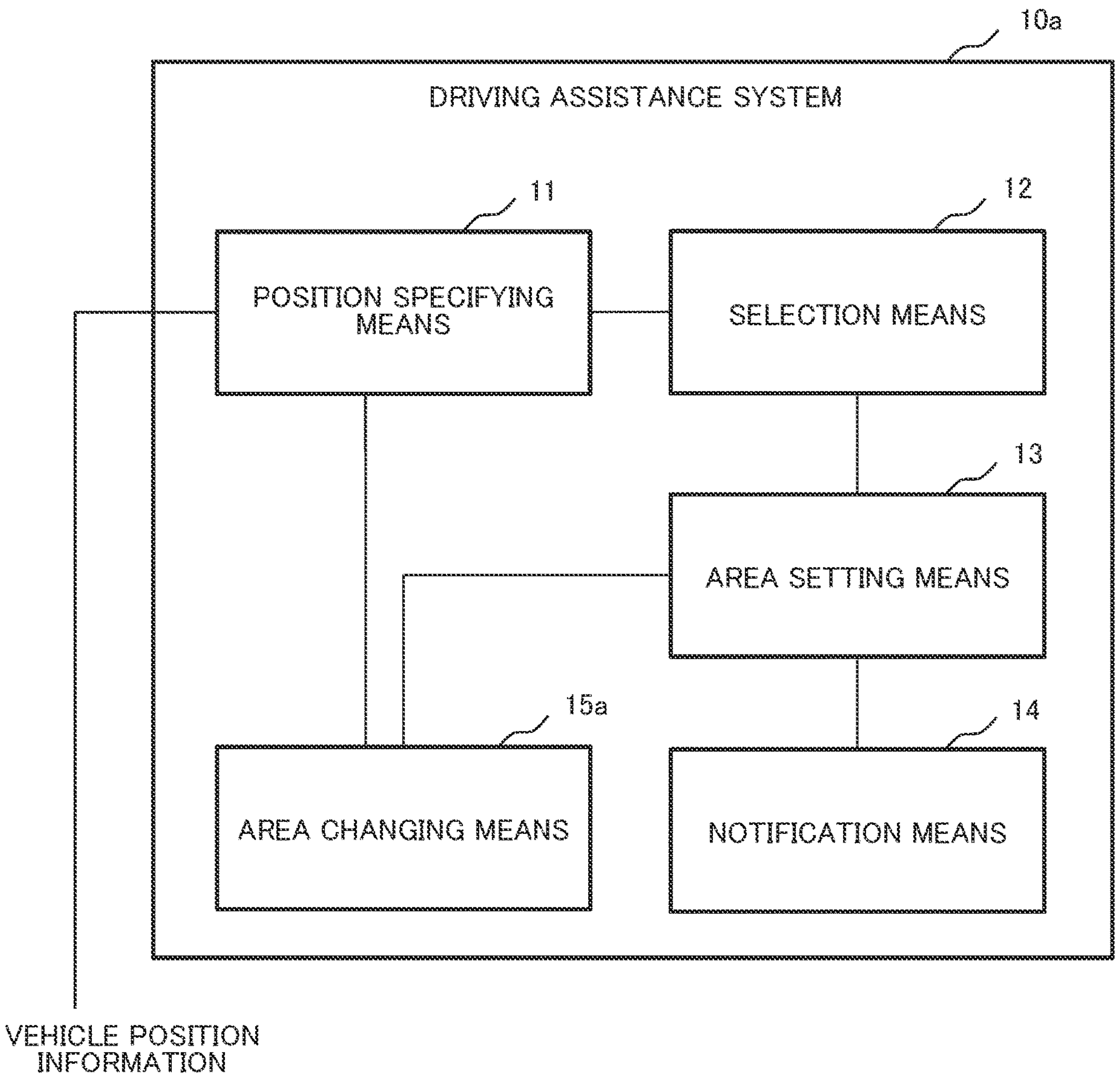
FIG. 8 is a diagram illustrating a configuration of a driving assistance system according to a second example embodiment of the present invention.

Next, a second example embodiment in which a method of enlarging the call attention area by the driving assistance system 10 is changed will be described in detail with reference to the drawings. FIG. 8 is a diagram illustrating a configuration of a driving assistance system according to the second example embodiment of the present invention. A difference from the first example embodiment illustrated in FIG. 1 is that an area changing means 15*a* is configured to enlarge the call attention area from a position of a first vehicle toward a direction of the vehicle (second vehicle) when it is detected that the vehicle has entered the call attention area. Since the other configurations are similar to those of the first example embodiment, the description thereof will be omitted, and the differences will be mainly described below.

Figure 9A:
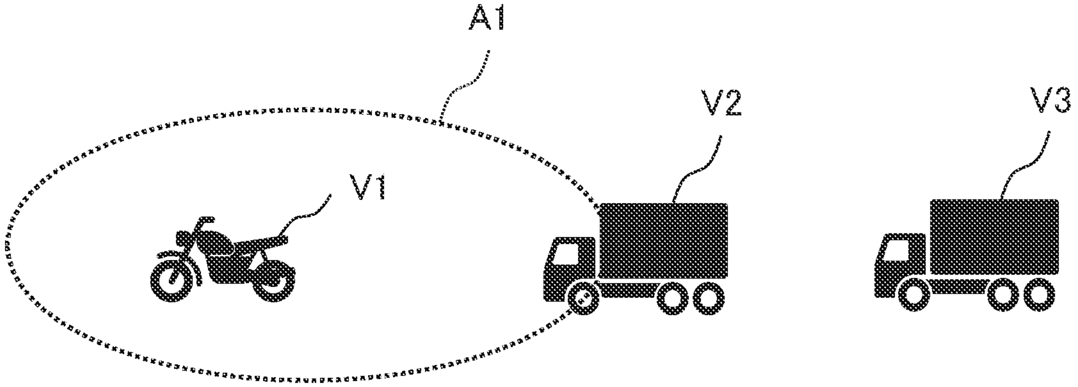
FIG. 9A is a diagram for describing an example of change processing of a call attention area by the driving assistance system according to the second example embodiment of the present invention.
Figure 9B:
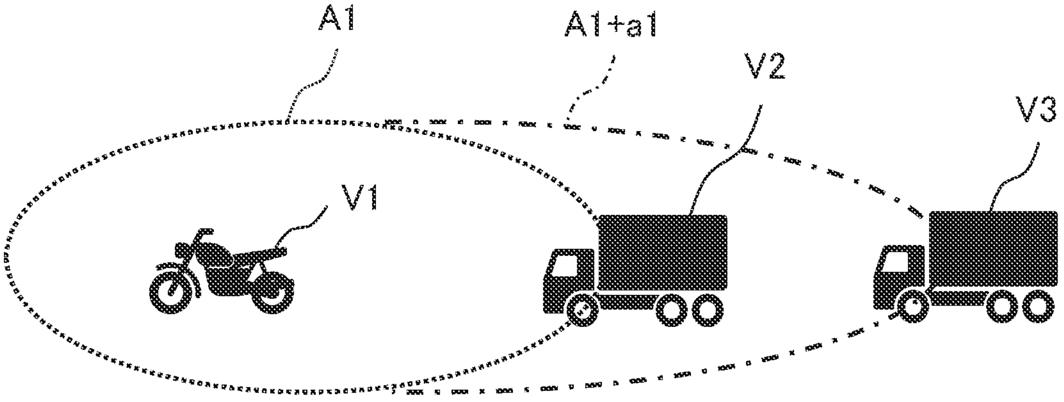
FIG. 9B is a diagram for describing an example of the change processing of a call attention area by the driving assistance system according to the second example embodiment of the present invention.

FIGS. 9A and 9B are diagrams for describing the operation of the area changing means 15*a* of the driving assistance system 10*a* according to the second example embodiment of the present invention. As illustrated in FIGS. 9A and 9B, when it is detected that the vehicle V2 has entered the call attention area A1, the driving assistance system 10 of the second example embodiment enlarges the call attention area A1 in the direction of the detected vehicle V2 and changes the call attention area A1 to the call attention area A1+a1.

As illustrated in FIG. 9B, when the vehicle V2 and the vehicle V3 enter the enlarged call attention area A1+a1 set in the vehicle V1, the driving assistance system 10*a* notifies both the vehicle V2 and the vehicle V3 of the presence of the first vehicle V1.

As a result, according to the present example embodiment, it is possible to call attention to approach of the vehicle V1 even to the vehicle V3 that cannot visually recognize the vehicle V1 due to the reason that the vehicle V2 blocks the field of view or the like. In the examples of FIGS. 9A and 9B described in the above example embodiment, since the vehicle V2 enters the call attention area from the rear of the vehicle V1, an example in which the call attention area is enlarged in the rear direction of the vehicle V1 has been described, but the expansion direction of the call attention area is not limited thereto. For example, when another vehicle enters the call attention area from a side or an oblique rear of the vehicle V1, the call attention area can be enlarged in these entry directions.

In the above-described example embodiment, it has been described that the call attention area is enlarged when the vehicle V2 enters the call attention area A1. However, instead of uniformly enlarging the call attention area, a condition for enlarging other call attention areas may be added. For example, a method of enlarging the call attention area on the condition that the vehicle V2 blocks the visual field of the vehicle V3 can also be adopted. For example, when a third vehicle is present at a position that is a blind spot by the second vehicle as viewed from the position of the vehicle V1 (first vehicle), the driving assistance system 10*a* can adopt a method of enlarging the call attention area. In many cases, when the third vehicle is present at the position that is the blind spot as viewed from the position of the vehicle V1 (first vehicle), it is considered that the vehicle V1 (first vehicle) cannot be visually recognized from the third vehicle in many cases.

Whether the third vehicle is present at a position that is a blind spot by the second vehicle as viewed from the position of the vehicle V1 (first vehicle) can be determined from the position of each vehicle, the vehicle type of the second vehicle, and the like. For example, the call attention area may be enlarged when another vehicle is present in the direction from the first vehicle V1 to the second vehicle V2 after detection of entry of the second vehicle into the call attention area.

Third Example Embodiment

Figure 10:
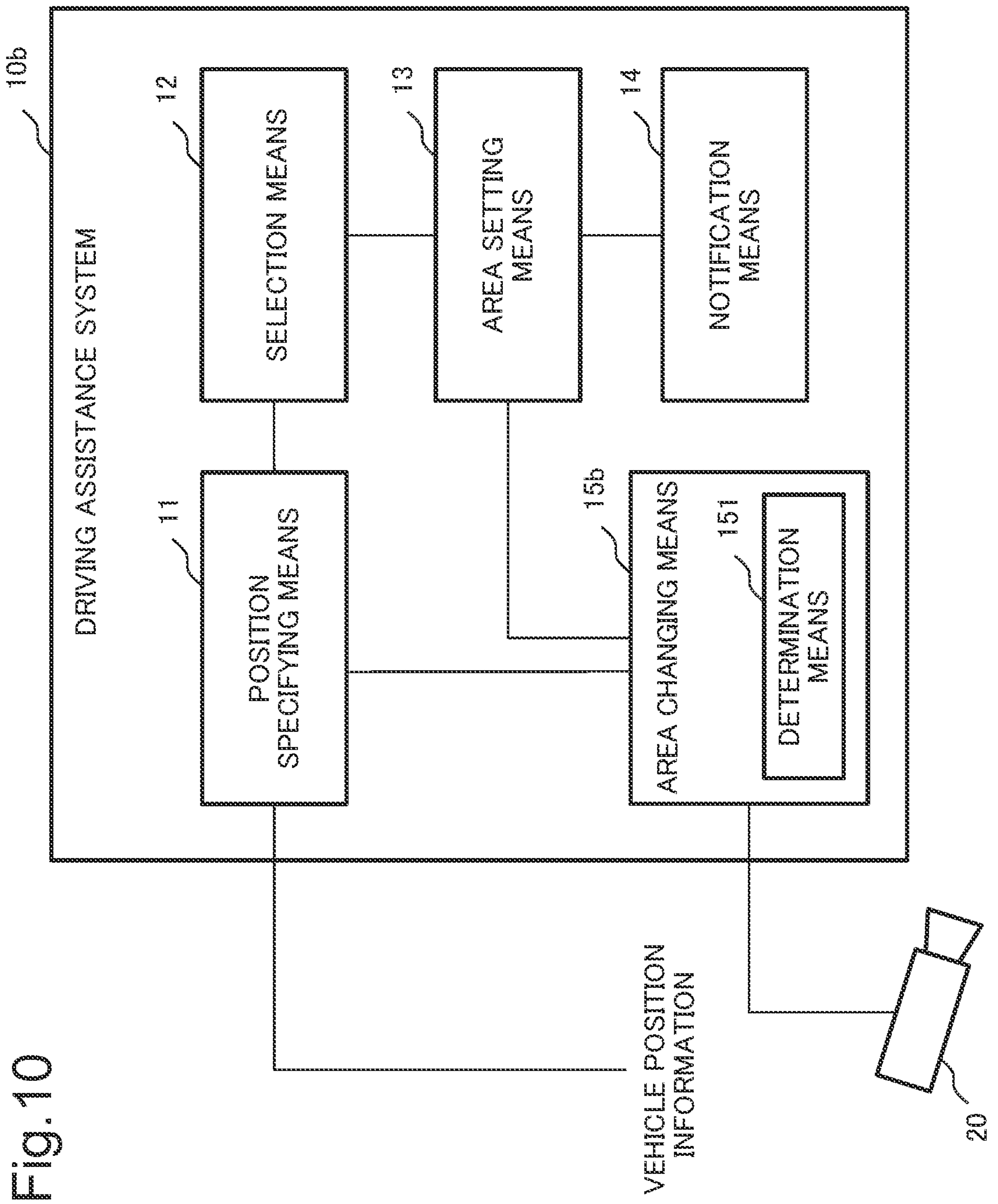
FIG. 10 is a diagram illustrating a configuration of a driving assistance system according to a third example embodiment of the present invention.

Next, a third example embodiment in which a method of enlarging the call attention area by the driving assistance system 10 is changed will be described in detail with reference to the drawings. FIG. 10 is a diagram illustrating a configuration of a driving assistance system according to the third example embodiment of the present invention. A difference from the first example embodiment illustrated in FIG. 1 is that a determination means 151 for determining whether there is a possibility that an occupant of the first vehicle gets out of the vehicle is added to the area changing means 15*b*, and the call attention area is configured to be enlarged according to the result. Since the other configurations are similar to those of the first example embodiment, the description thereof will be omitted, and the differences will be mainly described below.

The determination means 151 can acquire an image around the road from the camera 20 installed around the road, and determines whether there is a possibility that the occupant of the first vehicle V1 gets out of the vehicle based on the image. Whether there is a possibility that the occupant of the vehicle V1 gets out of the vehicle may be determined based on whether the vehicle V1 flashes the hazard lamp and whether the vehicle V1 is a construction vehicle, a route bus, a delivery truck, or the like, in addition to the behavior of the driver and the occupant appearing in the image. The determination may be made based on position information acquired from a portable communication terminal owned by the driver or the occupant via a MEC server or a roadside device. Opening/closing information of a door of the vehicle may be acquired and determined.

Figure 11A:
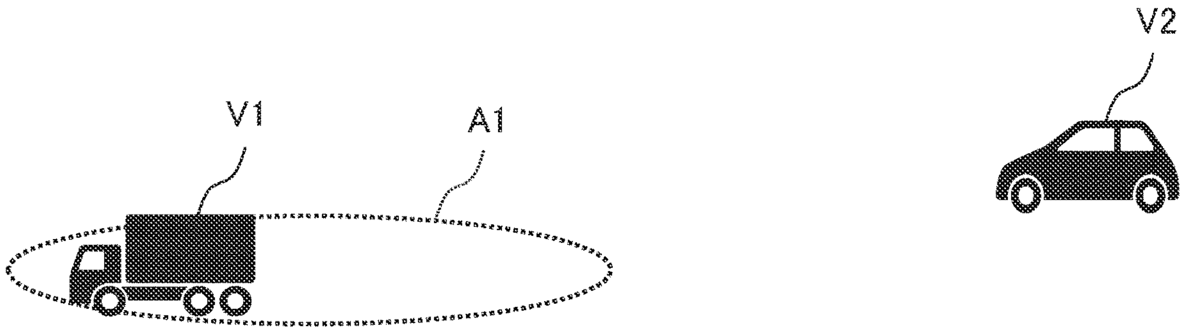
FIG. 11A is a diagram for describing an example of change processing of a call attention area by the driving assistance system according to the third example embodiment of the present invention.

When the determination means 151 determines that the driver of the first vehicle gets out of the vehicle, the area changing means 15*b* provides an enlarged area of the call attention area covering the position of the driver. For example, as illustrated in FIG. 11A, it is assumed that a call attention area A1 is provided around the vehicle V1 in the initial state. Then, when it is determined that the occupant M1 of the first vehicle V1 gets out of the vehicle, the area changing means 15*b* adds the enlarged region a1 to the call attention area A1 and sets the enlarged call attention area A1+a1. The method for arranging the enlarged region a1 is not particularly limited, but the call attention area A1 can be provided by enlarging the call attention area A1 in the direction of an entrance or the door of the vehicle V1 in a very simple manner.

Figure 11B:
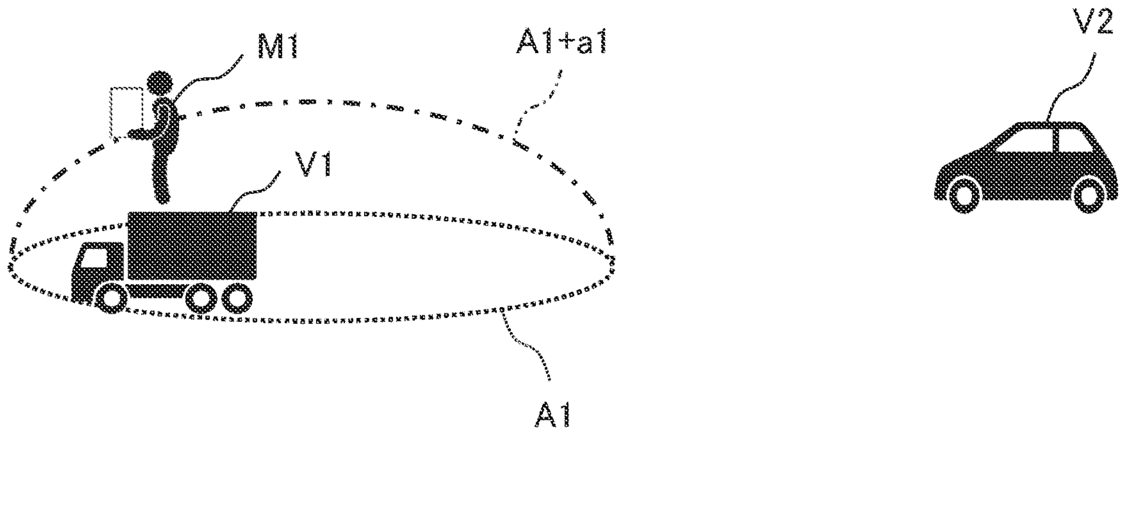
FIG. 11B is a diagram for describing an example of the change processing of the call attention area by the driving assistance system according to the third example embodiment of the present invention.

Thereafter, as illustrated in FIG. 11B, the driving assistance system 10*b* calls attention to the entering vehicle based on the enlarged call attention area A1+a1. Specifically, when the vehicle V2 enters the enlarged call attention area A1+a1, the driving assistance system 10*b* notifies the vehicle V2 of the presence of the first vehicle V1. This notification may include, in addition to the presence of the vehicle V1, the possibility that the person M1 is present around the vehicle V1, an instruction to take a sufficient distance when passing the side of the vehicle V1, and the like.

As described above, according to the present example embodiment, it is possible to prevent a contact accident or the like between the occupant who gets out of the vehicle V1 and a vehicle coming from behind or the like. In particular, in a construction vehicle, after arriving at the site, a person may descend to a median strip or a roadway side. Even in such a case, it is possible to effectively call attention to a vehicle coming from behind. In the case of a route bus or a kindergarten/school bus, there is a case where a child or the like who gets off the bus goes to a sidewalk in the opposite lane from the shadow of the stopped bus. In such a case, attention can be effectively attracted.

Figure 12A:
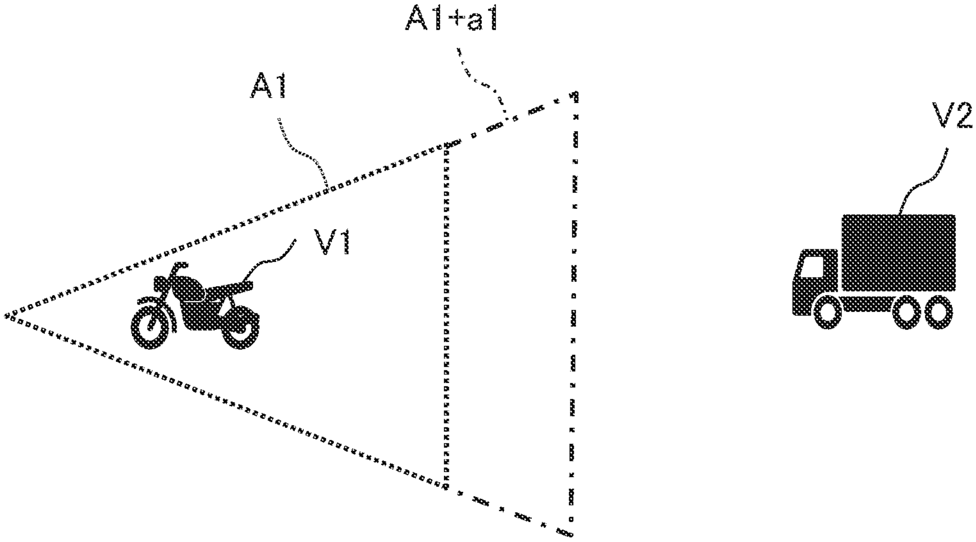
FIG. 12A is a diagram illustrating a modification of a call attention area set by the driving assistance system of the present invention.
Figure 12B:
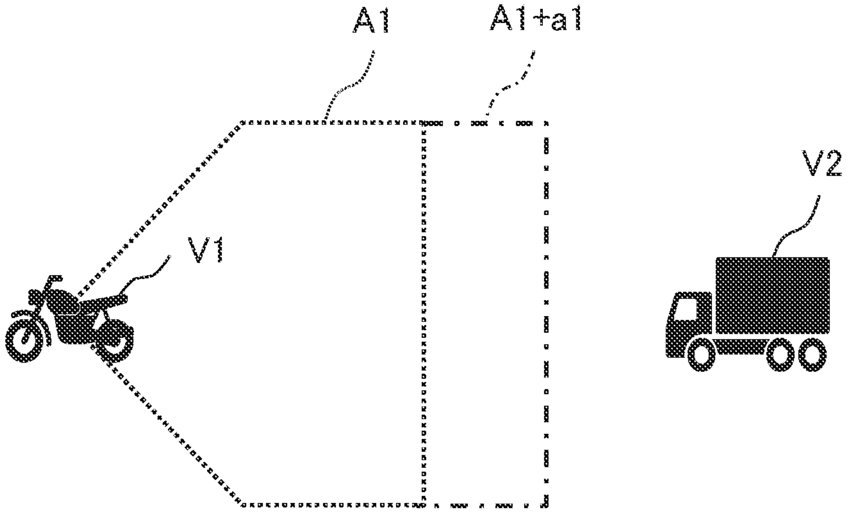
FIG. 12B is a diagram illustrating a modification of the call attention area set by the driving assistance system of the present invention.

Although the example embodiments of the present invention have been described above, the present invention is not limited to the above-described example embodiments, and further modifications, substitutions, and adjustments can be made without departing from the basic technical idea of the present invention. For example, the configuration of the system, the configuration of each element, and the expression form of data and the like illustrated in the drawings are examples for assisting the understanding of the present invention, and are not limited to the configurations illustrated in the drawings. For example, in the first to third example embodiments described above, it has been described that the call attention area having a substantially elliptical shape is provided, but the shape of the call attention area is not limited thereto. For example, as illustrated in FIGS. 12A and 12B, a triangle (cone type) or a polygon (home base type) may be adopted as the call attention area. The call attention area does not necessarily have to surround the position of the vehicle V1 (first vehicle), and for example, as illustrated in FIG. 12B, a call attention area having the position of the vehicle V1 (first vehicle) as a vertex may be provided.

In the above example embodiment, the size of enlarging the call attention area is not particularly mentioned, but the size of enlarging or reducing the call attention area may be changed according to the state of the first vehicle or the like. For example, when the call attention area is enlarged or reduced based on the speed of the first vehicle as in the first example embodiment, the size of enlarging or reducing the call attention area may be changed according to the size of the difference from the thresholds th1 and th2.

Figure 13:
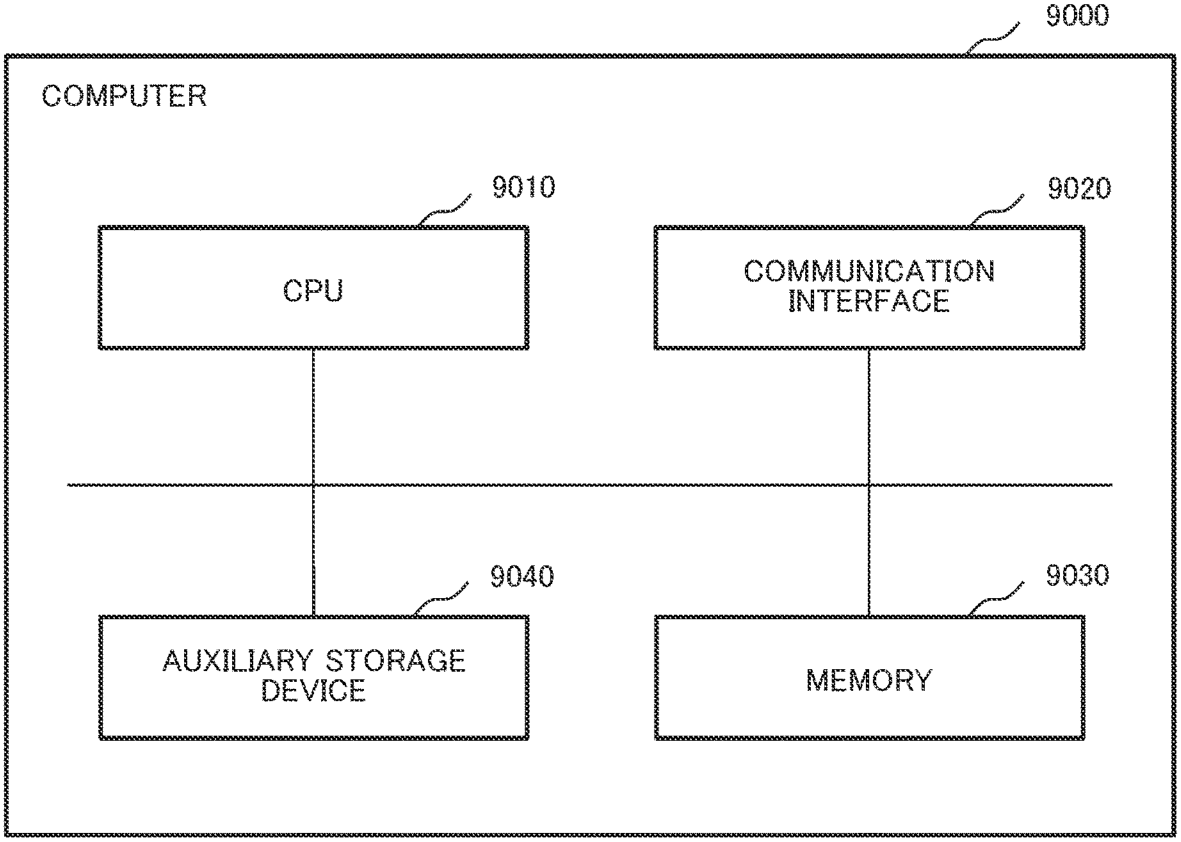
FIG. 13 is a diagram illustrating a configuration of a computer that can function as a driving assistance device of the present invention.

The procedure described in each of the above example embodiments can be achieved by a computer functioning as a device constituting the driving assistance systems 10 to 10*b*. Specifically, the present invention can be implemented by a program for causing a computer (9000 in FIG. 13) to implement functions as these devices. Such a computer is exemplified in a configuration including a central processing unit (CPU) 9010, a communication interface 9020, a memory 9030, and an auxiliary storage device 9040 in FIG. 13. That is, the CPU 9010 of FIG. 13 may execute a setting program of the call attention area and an entering vehicle determination program.

That is, each unit (processing means and function) of the driving assistance systems 10 to 10*b* described above can be achieved by a computer program that causes a processor mounted in each of these devices to execute each of the above-described processes using its hardware.

Some or all of the above example embodiments may be described as the following Supplementary Notes, but are not limited to the following.

Supplementary Note 1

(See the driving assistance system from the first viewpoint)

Supplementary Note 2

The area changing means of the driving assistance system may be configured to enlarge or reduce the call attention area according to a state around the first vehicle.

Supplementary Note 3

The area changing means of the driving assistance system may be configured to enlarge or reduce the call attention area according to a state in the call attention area.

Supplementary Note 4

When the second vehicle enters the call attention area, the area changing means of the driving assistance system can be configured to enlarge or reduce the call attention area based on vehicle information of the second vehicle.

Supplementary Note 5

When the second vehicle enters the call attention area, the area changing means of the driving assistance system can be configured to enlarge the call attention area from a position of the first vehicle toward a direction of the second vehicle.

Supplementary Note 6

When a third vehicle is present at a position that is a blind spot by the second vehicle as viewed from the position of the first vehicle, the area changing means of the driving assistance system can be configured to enlarge the call attention area in a direction of a third vehicle.

Supplementary Note 7

The driving assistance system further includes a determination means that determines whether there is a possibility that an occupant of the first vehicle gets out of the vehicle, and when it is determined that there is a possibility that the occupant of the first vehicle gets out of the vehicle, the area changing means can be configured to provide an enlarged region of the call attention area covering the position of the occupant.

Supplementary Note 8

The position specifying means of the driving assistance system can be configured to specify the position of the vehicle from an image captured by a camera capable of capturing the road.

Supplementary Note 9

The position specifying means of the driving assistance system can be configured to specify the position of the vehicle by acquiring, from the vehicle via a roadside device or a mobile communication network, position information measured by a GPS device mounted on the vehicle.

Supplementary Note 10

The notification means of the driving assistance system can be configured to notify the first vehicle of presence of the second vehicle that has entered the call attention area.

Supplementary Note 11

(See the driving assistance device from the second viewpoint)

Supplementary Note 12

(See the driving assistance method from the third viewpoint)

Supplementary Note 13

(See the program from the fourth viewpoint)

The forms of Supplementary Notes 11 to 13 can be enlarged to the forms of the Supplementary Notes 2 to 10, similarly to the Supplementary Note 1.

The disclosure of the above patent documents is incorporated herein by reference. Within the frame of the entire disclosure (including the claims) of the present invention, it is possible to change and adjust the example embodiments or examples further based on the basic technical idea thereof. Various combinations or selections (including partial deletions) of various disclosure elements (Each element of each claim, each element of each example embodiment or example, each element of each drawing, and the like are included.) can be made within the frame of the disclosure of the present invention. That is, it is a matter of course that the present invention includes various modifications and corrections that can be made by those skilled in the art according to the entire disclosure including the claims and the technical idea. In particular, for numerical ranges set forth herein, any numerical value or sub-range included within the range should be construed as being specifically described, even if not stated otherwise.

REFERENCE SIGNS LIST

10, 10*a*, 10*b* driving assistance system
11 position specifying means
12 selection means
13 area setting means
14 notification means
15, 15*a*, 15*b* area changing means
20 camera
21 roadside device
22 base station
151 determination means
9000 computer
9010 CPU
9020 communication interface
9030 memory
9040 auxiliary storage device
A1, A1+a1, A1−a2 call attention area
V1 to V4 vehicle
M person

What is claimed is:

1. A driving assistance system comprising:

at least one memory storing instructions; and at least one processor configured to execute the instructions to:

specify a position of each vehicle of a plurality of vehicles traveling on a predetermined section of a road;

select a first vehicle from the plurality of vehicles based on criteria related to the first vehicle or a driver;

set, around the first vehicle, a call attention area having a predetermined shape that moves following movement of the first vehicle;

notify a second vehicle that has entered the call attention area of presence of the first vehicle; and enlarge or reduce the call attention area according to a state of the first vehicle, wherein the at least one processor is further configured to execute the instructions to:

enlarge the call attention area when a speed of the first vehicle is less than a first threshold, and reduce the call attention area when the speed of the first vehicle is equal to or greater than a second threshold that is equal to or greater than the first threshold.

2. The driving assistance system according to claim 1, wherein the at least one processor is further configured to execute the instructions to:

enlarge or reduce the call attention area according to a state in the call attention area.

3. The driving assistance system according to claim 1, wherein the at least one processor is further configured to execute the instructions to:

when the second vehicle enters the call attention area, enlarge or reduce a size of the call attention area based on vehicle information of the second vehicle.

4. The driving assistance system according to claim 1, wherein the at least one processor is further configured to execute the instructions to:

when the second vehicle enters the call attention area, enlarge the call attention area from a position of the first vehicle toward a direction of the second vehicle.

5. The driving assistance system according to claim 1, wherein the at least one processor is further configured to execute the instructions to:

when a third vehicle is present at a position that is a blind spot by the second vehicle as viewed from a position of the first vehicle, enlarge the call attention area in a direction of the third vehicle.

6. The driving assistance system according to claim 1, wherein the at least one processor is further configured to execute the instructions to:

determine whether there is a possibility that an occupant of the first vehicle gets out of the vehicle; and when it is determined that there is a possibility that the occupant of the first vehicle gets out of the vehicle, provide an enlarged area of the call attention area around a position of the occupant.

7. The driving assistance system according to claim 1, wherein the at least one processor is further configured to execute the instructions to:

specify the position of the vehicle from an image captured by a camera capable of capturing the road.

8. The driving assistance system according to claim 1, wherein the at least one processor is further configured to execute the instructions to:

specify the position of the vehicle by acquiring, from the vehicle via a roadside device or a mobile communication network, position information measured by a GPS device mounted on the vehicle.

9. The driving assistance system according to claim 1, wherein the at least one processor is further configured to execute the instructions to:

notify the first vehicle of presence of the second vehicle that has entered the call attention area.

10. A driving assistance device comprising:

at least one memory storing instructions; and at least one processor configured to execute the instructions to:

specify a position of each vehicle of a plurality of vehicles traveling on a predetermined section of a road;

select a first vehicle from the plurality of vehicles based on criteria related to the first vehicle or a driver;

set, around the first vehicle, a call attention area having a predetermined shape that moves following movement of the first vehicle;

notify a second vehicle that has entered the call attention area of presence of the first vehicle; and enlarge or reduce the call attention area according to a state of the first vehicle, wherein the at least one processor is further configured to execute the instructions to:

enlarge the call attention area when a speed of the first vehicle is less than a first threshold, and reduce the call attention area when the speed of the first vehicle is equal to or greater than a second threshold that is equal to or greater than the first threshold.

11. The driving assistance device according to claim 10, wherein the at least one processor is further configured to execute the instructions to:

enlarge or reduce the call attention area according to a state in the call attention area.

12. The driving assistance device according to claim 10, wherein the at least one processor is further configured to execute the instructions to:

when the second vehicle enters the call attention area, enlarge or reduce a size of the call attention area based on vehicle information of the second vehicle.

13. The driving assistance device according to claim 10, wherein the at least one processor is further configured to execute the instructions to:

when the second vehicle enters the call attention area, enlarge the call attention area from a position of the first vehicle toward a direction of the second vehicle.

14. The driving assistance device according to claim 10, wherein the at least one processor is further configured to execute the instructions to:

when a third vehicle is present at a position that is a blind spot by the second vehicle as viewed from a position of the first vehicle, enlarge the call attention area in a direction of the third vehicle.

15. The driving assistance device according to claim 10, wherein the at least one processor is further configured to execute the instructions to:

determine whether there is a possibility that an occupant of the first vehicle gets out of the vehicle; and when it is determined that there is a possibility that the occupant of the first vehicle gets out of the vehicle, provide an enlarged area of the call attention area around a position of the occupant.

16. The driving assistance device according to claim 10, wherein the at least one processor is further configured to execute the instructions to:

specify the position of the vehicle from an image captured by a camera capable of capturing the road.

17. The driving assistance device according to claim 10, wherein the at least one processor is further configured to execute the instructions to:

specify the position of the vehicle by acquiring, from the vehicle via a roadside device or a mobile communication network, position information measured by a GPS device mounted on the vehicle.

18. A driving assistance method comprising:

specifying a position of each vehicle of a plurality of vehicles traveling on a predetermined section of a road;

selecting a first vehicle from the plurality of vehicles based on criteria related to the first vehicle or a driver;

setting, around the first vehicle, a call attention area having a predetermined shape that moves following movement of the first vehicle;

enlarging or reducing the call attention area according to a state of the first vehicle; and notifying a second vehicle that has entered the enlarged or reduced call attention area of presence of the first vehicle, wherein the driving assistance method further comprises:

enlarging the call attention area when a speed of the first vehicle is less than a first threshold, and reducing the call attention area when the speed of the first vehicle is equal to or greater than a second threshold that is equal to or greater than the first threshold.

* * * * *